United States Patent [19]

Bortolin et al.

[11] Patent Number: 4,842,438
[45] Date of Patent: Jun. 27, 1989

[54] METHOD FOR JOINING PLASTIC CORES WITH SPACED SURFACE GROOVES AND JOINT SO OBTAINED

[76] Inventors: Bruno Bortolin, Via Cantore, 23-Cinisello Balslamo; Enrico Dotti, Via Archimede 22, both of Milan, Italy

[21] Appl. No.: 34,422

[22] Filed: Apr. 3, 1987

[30] Foreign Application Priority Data

Apr. 14, 1986 [IT] Italy ............................... 20079 A/86

[51] Int. Cl.⁴ ........................... G02B 6/40; B25G 3/34
[52] U.S. Cl. ..................................... 403/266; 403/270; 403/286; 156/158; 350/96.22; 174/88 C
[58] Field of Search .................. 156/158, 303.1, 304.2, 156/159; 403/266, 270, 265, 286; 350/96.22, 96.23; 174/88 C

[56] References Cited

U.S. PATENT DOCUMENTS

| | | | |
|---|---|---|---|
| 4,172,746 | 10/1979 | LeNoane | 156/158 X |
| 4,220,619 | 9/1980 | Kersten | 156/158 X |
| 4,389,088 | 6/1983 | Trezequet | 350/96.23 |

*Primary Examiner*—Andrew V. Kundrat

[57] ABSTRACT

Method for joining thermoplastic cores having spaced, longitudinal surface grooves for receiving optical fibers or electrical wires. A heat shrinkable plastic sleeve is applied over the end of one of the cores. A piece of a core selected so that the ends of the grooves match, at each end, the grooves of the cores to be joined, is inserted between the ends of the cores in abutting relation with the cores, and malleable metal elements, longer than the piece and having the cross-sectional shape of the grooves are inserted in the grooves of the piece with the ends thereof in the grooves of the cores. The sleeve is slid over the elements-piece assembly and heated so that it shrinks therearound, so that the plastic of the piece and the cores is softened and the grooves conform to the shape of and embed the elements and so that the ends of the piece fuse with the ends of the cores. If the cores have a central resistant element, the resistant elements are bared so that their combined lengths equal that of the length of the piece and are mechanically joined, before the piece, which is a longitudinally slit sleeve, is inserted between the core ends and over the joined resistant elements.

9 Claims, 1 Drawing Sheet

METHOD FOR JOINING PLASTIC CORES WITH SPACED SURFACE GROOVES AND JOINT SO OBTAINED

The present invention relates to a method for joining the ends of two elongated elements provided with grooves spaced around their peripheries, commonly known as grooved cores, in particular to the type of elements which are intended for housing one or more optical elements, or optical fibers, in telecommunication cables, as well as the joint thus obtained.

By the term "grooved core" is meant a structure of a thermoplastic material, provided with one or more grooves upon its outer surface which are adapted to receive the transmissive elements of the optical type or of the electrical type. Preferably, the structure includes an element centrally thereof which is resistant to traction and compression.

Preferably, the central resistant element is a metal wire disposed in a central position around which a thermoplastic material covering is formed by extrusion. The grooves can be either rectilineal or a closed or an open helix (i.e. with periodic direction reversal), and they can be disposed over the entire outer surface, or else, on only one portion of it. The transmissive element of the optical type is preferably an optical fiber of the type which is provided with at least one primary covering.

The invention is directed to the joining of the ends of two grooved cores of the above-described type.

The grooved cores have to be connected to each other in various circumstances. For example, the joint of an optical fiber cable requires the joining of the grooved core as one step.

Moreover, the same grooved core, considered as a product which is intended to be used in optical fiber cables and, in general, for connections realized with optical elements, could require the said joining for various reasons.

In fact, although the construction of grooved cores having any length whatsoever is theoretically possible, the construction of lengths which are not excessively long is preferable both from a quality viewpoint of the product as well as for the transportation thereof.

The joining of the ends of the grooved cores is presently accomplished by mechanically connecting together the internal resistant elements, after the removal of an appropriate length of thermoplastic covering, and thereafter, reconstructing the thermoplastic covering with the grooves correctly aligned without any discontinuities which could negatively influence the transmission characteristics of the optical fibers which are housed therein.

According to the known technique, for reconstructing the portion of thermoplastic material, recourse is had to special molds inside which the two extremities of the cores are positioned, preferably, after the connection (through welding, ferrules etc.) of the central element, and wherein there is injected the thermoplastic material which is to form the reconstructed layer.

This method presents several drawbacks. Firstly, it requires a special mold and the necessary equipment for the fusing and molding processes.

Secondly, the mold of this type can be used only for a given grooved core, and a new mold must be prepared should a grooved core having different dimensions be used, or if the grooves are different in number, form, or layout, etc. Such a type of mold is costly and cannot be made ready in a short period of time and moreover, another mold must be substituted if the grooved core has to undergo even a minimum modification, for example, in the pitch of the grooves and/or of their depth.

Moreover, this operation requires a certain amount of skill since it requires an appropriate charge of the material introduced, the correct temperatures, etc.

Finally, since the mold is formed by two or more parts connected together, the formation of burrs at the joining line of the mold is unavoidable. Hence, said burrs have to be removed by means of a successive mechanical machining for eliminating the risk of introducing attenuations into the optical fibers.

Therefore, one object of the present invention is to provide a method which is especially simple, for joining the extremities of two grooved cores, which does not require the use of any costly equipment and which is easy to carry out on any type of grooved core.

A further object of the invention is to realize the joining in an optimum manner without requiring the need of further operations, and with using the minimum of equipment which is, therefore, inexpensive and simple to use and which can be made ready in a brief period of time for any type of grooved core.

The invention includes a method for joining the ends of two grooved core, each one comprising at least one central resistant element and a covering of thermoplastic material having on its outer surface one or more grooves which are adapted to receive transmissive elements of the optical type, characterized by the fact of comprising the following steps:

(a) placing, over one of the extremities of the grooved cores to be joined, a tube of a heat-shrinkable material having an inner diameter slightly greater than the outer diameter of the grooved core;

(b) removing the thermoplastic material from end portions of the two grooved cores and mechanically connecting the two central resistant elements to form a unitary resistant element;

(c) placing over the bared tract of the so-formed resistant element, a sleeve obtained by longitudinally slitting the plastic covering of a grooved core piece having a length equivalent to the length of the bared tract of the resistant element, which length is less than the length of the heat-shrinkable tube;

(d) coupling the grooves, of the joined core ends and of the sleeve, by introducing into each groove, a structural metal element of a greater length than that of the sleeve and having a configuration corresponding to that of the grooves of the cores;

(e) positioning the heat-shrinkable tube over the sleeve and over the structural elements and heating the assembly at a temperature which is sufficient to cause heat shrinking of the tube and the localized melting of the underlying thermoplastic material; and (f) removing the heat-shrinkable tube from the joint thus obtained.

The method of the invention also includes the steps set forth hereinbefore modified for the case in which the grooved cores do no have a central resistant element. In such case, the method eliminates the steps of connecting the central resistant elements and the slitting of a sleeve, the sleeve being replaced by a cylinder with grooves on the outer surface thereof corresponding to the grooves of the replaced sleeve.

The invention also includes a joint between two grooved cores which is obtained by said methods.

Other objects and advantages of the present invention will be apparent from the following detailed description of the presently preferred embodiments thereof, which description should be considered in conjunction with the accompanying drawings in which.

Although the method of the invention will be specifically described in connection with the joining of a pair of grooved cores, each with a central resistant element, the method of the invention is applicable with the modifications described hereinbefore to the joining of a pair of grooved cores without central resistant elements.

Figure 1:
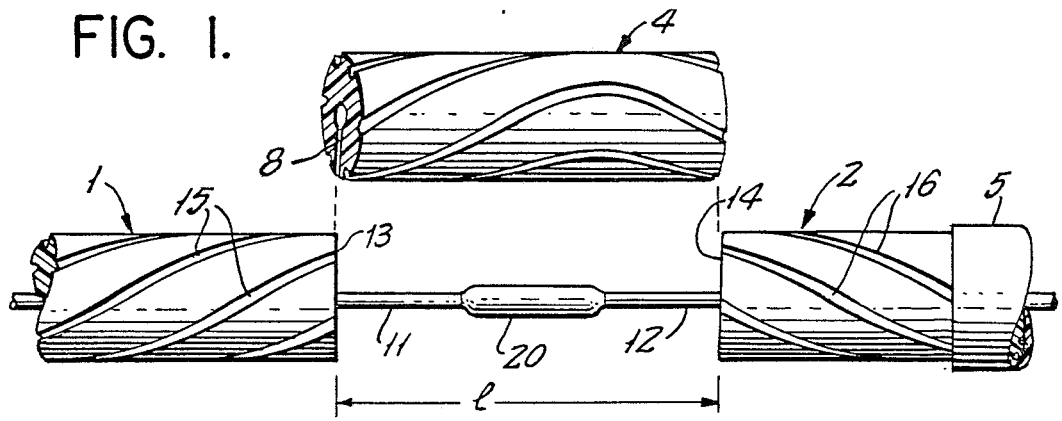
FIG. 1 is a diagrammatic, side elevation view showing bared central resistant elements of two cores, such elements being joined by a ferrule, and a grooved sleeve before it is applied over such elements and the ferrule.

The two grooved cores 1 and 2, shown in FIG. 1, are of the type having, respectively, central resistant elements 11 and 12 around which there are thermoplastic coverings 13 and 14 of nylon, for example. On the outer surfaces of the coverings 13 and 14, there are six equally distributed, helicoidal, open-helix grooves 15 and 16 i.e. grooves having the direction of the helix is periodically reversed. The resistant elements 11 and 12 for each of the cores could also be a plurality of elements twisted together.

A tube 5 of a heat-shrinkable material, with an inner diameter that is slightly greater than the diameter of the grooved cores is applied over one of the two cores 1 and 2. By "diameter of the grooved cores" is meant the diameter of a circle containing the grooved core. The softening temperature for the tube 5 is selected so as to be higher than the softening temperature of the thermoplastic material of the cores. In FIG. 1, the tube 5, only part of which is shown, is positioned on the core 2.

End portions of the thermoplastic coverings of said two grooved cores 1 and 2 are removed for a suitable length, which can be, for example, of 5-20 mm in length, for uncovering end portions of the resistant elements 11 and 12, which are thereafter joined together mechanically, for example, by a ferrule 20 or, alternatively, by other known means.

Generally speaking, the connection between the elements 11 and 12 causes a slight thickening at the joint between the resistant elements 11 and 12. FIG. 1 shows the configuration assumed by the two grooved cores 1 and 2 after the connection of the resistant elements 11 and 12.

Of course, if the grooved cores 1 and 2 do not have the resistant elements 11 and 12, it is not necessary to bare or connect them.

There is then prepared a joining piece of thermoplastic material in the form of a sleeve 4 having a length 1 which is equal to the length of the bared and joined resistant elements. The sleeve 4 is a length of a grooved core which is identical to the grooved cores to be joined in which a longitudinal cut or slit 8 has been made and through which the resistant element has been removed Said longitudinal cut 8 can be rectilineal or alternatively, curvilinear, in the latter case being disposed, for example, between two grooves so that none of the sleeve grooves become nicked or altered in any way by the longitudinal cut.

Figure 2:
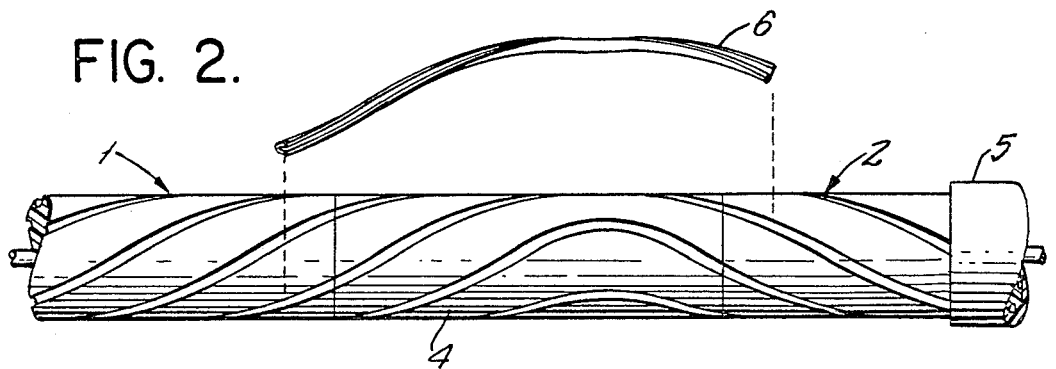
FIG. 2 is similar to FIG. 1 and illustrates the assembly after the grooved sleeve has been placed over said elements and said ferrule in association with a structural element before it is inserted in a groove of a sleeve and in corresponding grooves on the cores.

Sleeve 4 is then positioned, by means of the longitudinal cut 8, on the joined resistant elements, as shown in FIG. 2, with alignment, as much as possible, of the grooves 15 and 16 of the core ends to be joined with the corresponding grooves present on the sleeve 4.

If the grooved cores do not have the resistant elements 11 and 12, the sleeve 4 may be replaced by a cylinder of a grooved core, and the cylinder need not be cut to permit placing thereof over such elements.

Successively, into each groove on the sleeve 4, or into each groove on the cylinder, and into the grooves 15 and 16, there is inserted a metal structural element 6 having a cross-section corresponding to the cross-sections of the grooves in the sleeve 4, or the cylinder, a length greater than the sleeve length 1, and a configuration corresponding to that of the core grooves. The element 6 has a helical configuration which will extend the open-helix configuration of grooves of the cores 1 and 2. In the case of closed-helix, or rectilineal grooves on the cores 1 and 2, the elements 6 would have a corresponding configuration.

The elements 6 are obtained by simply drawing a soft pliable material, for example, copper or aluminum, through a suitable die and shaping them manually. Their elasticity can compensate for any imperfect reproduction of the configuration of the grooves. Moreover, the cost thereof is rather negligible, and they can be prepared as a function of the dimensions of the grooved cores, of the shape of the cross-section of the grooves, and of the configuration of the grooves, in a simple and rapid manner.

Figure 3:
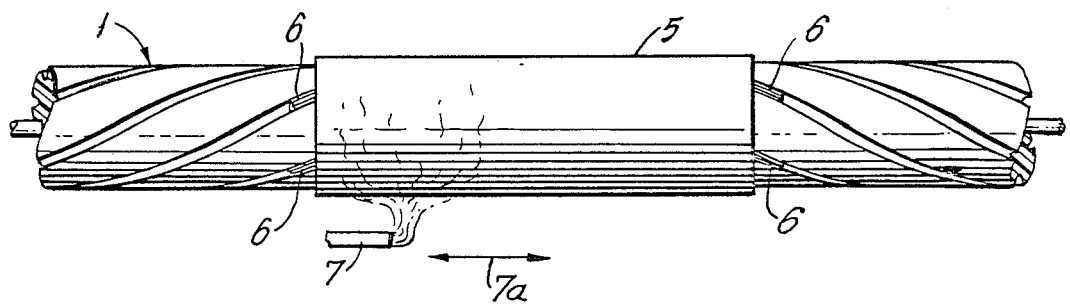
FIG. 3 is similar to FIG. 1 and shows the assembly after the structural elements are inserted in the grooves and a heat-shrinkable tube is applied over such elements, the grooved sleeve and the end portions of the cores and indicate application of heat.

Once the structural elements 6 have been inserted into the grooves of the cores 1 and 2 and of the sleeve 4 in such a manner as to connect them together, then the heat-shrinkable tube 5 is slid axially and positioned on the sleeve 4 with overlapping of end portions of the cores 1 and 2 as shown in FIG. 3. The length of the tube 5 is greater than the length of the sleeve 4, but it is preferably less than the length of the structural elements 6. Thereafter, heating of the tube 5 and the underlying sleeve 4 and end portions of cores 1 and 2 is carried out in a uniform way, either with hot air or with a flame 7, which is moved both longitudinally, as indicated by the arrow 7 in FIG. 3, and around the tube 5.

The heat causes a uniform thermal shrinkage of the tube 5 around the underlying thermoplastic material and localized melting of he underlying thermoplastic material, which becomes shaped, or molded by the structural elements 6 and by the inner surface of the tube 5 in such a way as to form helical grooves which are devoid of any discontinuity and/or burrs. By reason of the melting of the thermoplastic material of the cores and the sleeve 4, the ends of the sleeve 4 fuse with the ends of the cores 1 and 2.

As already indicated, the tube 5 is made out of a thermo-shrinkable material having a melting temperature higher than the melting temperature of the thermoplastic material of the cores 1 and 2 and the sleeve 4, the latter melting temperature being approximately equal to the temperature at which said thermal-shrinkage occurs. The material of the said tube 5 can, for example, be a fluoro-polymer.

The inner diameter of tube 5 is slightly greater than the diameter of the grooved cores 1 and 2, so that the same tube 5 is suitable for use with grooved cores having various diameters, and can, of course, allow for construction tolerances which could be encountered with grooved cores which are produced, for example, at different times.

Once the joint is cooled, tube 5 is removed, by making a longitudinal cut therein, from the joined grooved cores 1 and 2 and the thermoplastic material does not have any discontinuities. Also, enlargement, due to the ferrule 20, does not affect the grooves due to plastic flow.

The method, according to the invention, is particularly advantageous and economical. In fact, it allows for completely eliminating the costs involved with using a mold which is substituted for by low priced components, such as the structural elements 6 and the thermoshrinkable sleeve 5. Moreover, the method is flexible, since, contrary to what could be had with molds, it is independent of exact dimensions and of any particular configuration of the grooved core. Moreover, the necessary components 5 and 6 can, if necessary, be prepared in a very short period of time.

Moreover, the elimination of the mold itself allows for charging, with precision, the quantity of thermoplastic material which is necessary for reconstructing. In fact, except for the slight excess due to the thickening in correspondence of the joint between the resistant elements, the sleeve 4 contains the exact quantity of material necessary for reconstructing the tract of length 1.

The joining operations do not require any particular skill, since no critical operations exist, not even for the heating necessary for melting. Finally, no supplementary working operations are necessary for the elimination of burrs.

The invention is applicable to different types of grooved cores and in particular, cores having rectilineal, closed-helix grooves, or other configurations for said grooves.

Figure 4:
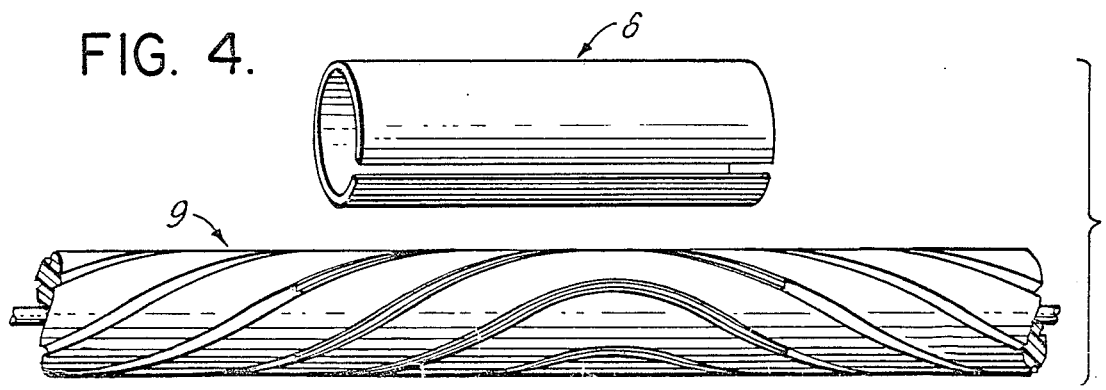
FIG. 4 is similar to FIG. 1 and shows the cores joined by the grooved sleeve in association with the removed heat-shrunk tube.

Although the invention has been described in connection with the joining of groove cores which do not already have optical fibers in the grooves, the method of the invention may also be used to splice cables having optical fibers in the grooves provided that such fibers are moved away from the sleeve 4 area during the carrying out of the method. The fibers may be joined together and placed in the grooves of the sleeve after the structure shown in FIG. 4 has been completed.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A method for joining the ends of two grooved cylindrical cores, each core having a layer of thermoplastic material with peripherally spaced, longitudinally extending grooves for receiving energy transmissive elements, said method comprising:
    applying, over an end portion of one of the cores, a tube of heat shrinkable material having an inner diameter greater than the outer diameters of the cores but which can be reduced by the application of heat to a diameter at least as small as said diameters of said cores;
    inserting a joining piece of thermoplastic material having a length less than the length of said tube between said ends of the cores to be joined and with the ends of the piece abutting said ends of the cores, said piece having a diameter substantially equal to said diameters of said cores and having peripherally spaced grooves thereon corresponding to said grooves of said cores, said piece being disposed with each groove thereon extending respectively between a groove on one said core and a groove in the other said core;
    inserting into each groove on said piece, a metal element having a length greater than the distance between said ends of said cores so that end portions of said metal element extend into grooves on said cores, said metal element having a cross-sectional configuration corresponding to the cross-sectional configuration of said grooves of said cores;
    positioning said heat shrinkable tube over said piece end portions of said cores and at least over the central portion of each said metal element; and
    applying heat to said tube, the metal elements and the material of said piece and said end portions of said cores to cause shrinking of said tube onto said metal elements and localized softening of the last-mentioned said material.

2. Method as set forth in claim 1 wherein said heat is applied in an amount sufficient to embed each metal element in said grooves and to fuse said ends of said piece with said ends of said cores.

3. Method as set forth in claim 1 wherein said tube is removed after the joint is formed.

4. Method as set forth in claim 1 wherein each of said cores comprises a central resistant element which is surrounded by said layer of thermoplastic material and said piece is a longitudinally slit sleeve and further comprising the following steps:
    removing portions of said layer of plastic material from said resistant element of each core for a length such that the combined lengths of the resistant elements from which the layer is removed is substantially equal to the length of said sleeve;
    mechanically interconnecting said resistant elements at their ends; and
    thereafter, inserting said sleeve between said ends of said cores with said sleeve encircling the interconnected resistant elements.

5. A joint between a pair of grooved cylindrical cores with an outer layer of thermoplastic material, each core having a plurality of peripherally spaced grooves in said outer layers, a joining piece intermediate and abutting the ends of said cores, said joining piece being made of a thermoplastic material and having peripherally spaced grooves in the outer surface thereof, each of the latter grooves extending respectively between a groove of one of said cores to a groove of the other of said cores and a plurality of metal elements longer than the length of said joining piece disposed in said grooves of said joining piece and having one end portion in a groove of one of said cores and the opposite end portion thereof in a groove of the other of said cores, each said metal element having an inner surface corresponding in shape to the shape of the surface of the groove in which it is received.

6. A joint as set forth in claim 5 wherein each end portion of a metal element is embedded in the material of the core having the groove in which it is received.

7. A joint as set forth in claim 6 wherein the central portion of each metal element is embedded in the material of said joining piece.

8. A joint as set forth in claim 5 wherein the ends of said joining piece are fused with said ends of said cores.

9. A joint as set forth in claim 5 wherein each said core has a central resistant element surrounded by said outer layer of plastic material and wherein the resistant element of one of said cores is mechanically connected to the resistant element of the other of said cores within said joining piece.

* * * * *